(12) United States Patent
Suganuma

(10) Patent No.: US 8,854,732 B2
(45) Date of Patent: Oct. 7, 2014

(54) LIGHT-GUIDING SUBSTRATE AND OPTICAL SYSTEM PROVIDED WITH SAME

(75) Inventor: Takayoshi Suganuma, Saitama (JP)

(73) Assignee: Enplas Corporation, Saitama (JP)

( * ) Notice: Subject to any disclaimer, the term of this patent is extended or adjusted under 35 U.S.C. 154(b) by 56 days.

(21) Appl. No.: 13/378,902

(22) PCT Filed: Jun. 16, 2010

(86) PCT No.: PCT/JP2010/004018
§ 371 (c)(1),
(2), (4) Date: Dec. 16, 2011

(87) PCT Pub. No.: WO2010/146856
PCT Pub. Date: Dec. 23, 2010

(65) Prior Publication Data
US 2012/0087007 A1 Apr. 12, 2012

(30) Foreign Application Priority Data

Jun. 17, 2009 (JP) ................................ 2009-144411

(51) Int. Cl.
*G02B 5/18* (2006.01)
*F21V 8/00* (2006.01)

(52) U.S. Cl.
CPC ............ *G02B 6/0016* (2013.01); *G02B 5/1809* (2013.01)
USPC .......................................... 359/572; 359/569

(58) Field of Classification Search
USPC ............ 359/571, 572, 641; 385/37, 129, 130; 362/615, 623
See application file for complete search history.

(56) References Cited

U.S. PATENT DOCUMENTS

| 5,335,300 A * | 8/1994 | Hartman et al. ................. 385/37 |
| 6,598,987 B1 | 7/2003 | Parikka |
| 2003/0038949 A1* | 2/2003 | Degertekin et al. ........... 356/498 |
| 2005/0078374 A1 | 4/2005 | Taira et al. |
| 2009/0046367 A1* | 2/2009 | Kim et al. ..................... 359/566 |

FOREIGN PATENT DOCUMENTS

| JP | 60-188910 A | 9/1985 |
| JP | 2-158928 A | 6/1990 |
| JP | 5-067345 A | 3/1993 |

(Continued)

*Primary Examiner* — William Choi
*Assistant Examiner* — Sharrief Broome
(74) *Attorney, Agent, or Firm* — Washida IP Group, LLC

(57) ABSTRACT

Provided is a light-guiding substrate that can propagate light, which has been emitted by means of a light emitting device, in a confined state with an efficiency as high as possible. An optical system provided with the light-guiding substrate is also provided. The light-guiding substrate (5) generates 0-order light and +− first-order light by diffracting, by means of a first sub wavelength diffracting grating (12), light which has been inputted from the light emitting device (7) via a collimation lens (8), generates +− first-order light by reflecting/refracting, by means of a second sub wavelength diffracting grating (15), the 0-order light that has passed through the first sub wavelength diffracting grating (12), and propagates the +− first-order light, which has been generated by means of the first sub wavelength diffracting grating (12); and the second sub wavelength diffracting grating (15), in the direction that orthogonally intersects the thickness direction, while totally reflecting the light by means of both the surfaces (10, 11) of the substrate main body (5a) in the thickness direction.

5 Claims, 11 Drawing Sheets

(56) References Cited

FOREIGN PATENT DOCUMENTS

| JP | 5-172633 A | 7/1993 |
| JP | 6-273639 A | 9/1994 |
| JP | 10-160964 A | 6/1998 |
| JP | 2000-056168 A | 2/2000 |
| JP | 2004-503808 A | 2/2004 |
| JP | 2004-273203 A | 9/2004 |
| JP | 2005-115176 A | 4/2005 |

* cited by examiner

LIGHT-GUIDING SUBSTRATE AND OPTICAL SYSTEM PROVIDED WITH SAME

TECHNICAL FIELD

The present invention relates to a light guide substrate and an optical system having the light guide substrate, and more particularly, to a light guide substrate and an optical system having the light guide substrate suitable for transmitting light emitted by a light emitting device such as laser.

BACKGROUND ART

In recent years, technology concerning semiconductor laser light source has improved significantly, and in near future, not only LEDs (Light Emitting Diode) but also LDs (Laser Diode) emit lights in three colors (red, green, and blue), and are expected to be applied to displays and the like. The features of the light output (emitted) from such LD have advantages in high conversion efficiency from electricity to light and high coherency but have disadvantages in high NA (Numerical Aperture) of light output and large expanding angle, thus being difficult to be used.

CITATION LIST

Patent Literature

PTL 1
Japanese Patent Application Laid-Open No. 2004-273203

SUMMARY OF INVENTION

Technical Problem

By the way, as the sizes of display are reduced recently, the need for confining light inside of a thin substrate with a high efficiency and causing the light to propagate in a direction perpendicular to a thickness direction of the substrate through the inside of the substrate is increasing. In order to satisfy this kind of need, means as shown in FIG. 1 is employed. In FIG. 1, while light emitting device 2 such as LED and LD is provided at a position facing lateral end surface (right end surface of FIG. 1) 1a of thin substrate 1, light output from light emitting device 2 enters into the inside of substrate 1 through lateral end surface 1a, and the incident light is repeatedly, totally reflected between upper surface 1b and lower surface 1c of substrate 1 in an alternate manner. Accordingly, the light can propagate in the direction perpendicular to the thickness direction of substrate 1.

However, the output lights of LED and LD are not parallel lights. The LD outputs light having Gaussian intensity distribution with a large divergence angle. In general, the LED outputs light having an extremely large divergence angle, which can be approximated with Lambert scatterer. For example, when the wavelength λ is 650 nm, the LD often uses divergence angle θ of 30 degrees.

Therefore, in the past, there used to be a problem in that it is difficult to cause light having such high NA to propagate in such a manner that the light is confined within substrate 1 with high efficiency.

There is an invention described in patent literature 1 as a conventional technique for solving this kind of problem. Patent literature 1 suggests use of a diffraction optical element as an incident coupler in order to couple light with a light guide plate using total reflection. Further, patent literature 1 indicates that the light is confined within the plate with high efficiency and small loss by means of the coupler using diffraction. However, patent literature 1 is silent on specific structure of the element and data such as diffraction efficiency. In general, such element using the diffraction has high-order diffraction light. For this reason, it is difficult to collect light of a particular order, and the loss of light caused by a certain level of escaped light power to a higher order diffraction light is usually inevitable.

An object of the present invention is to provide a light guide substrate and an optical system having the light guide substrate capable of causing light emitted by a light emitting device to propagate with as high efficiency as possible in such a manner that the light is confined.

Solution to Problem

A light guide substrate according to the present invention has a substrate main body formed to have a predetermined thickness, wherein a transmitting-type first sub-wavelength grating is formed on one of surfaces of the substrate main body in a thickness direction, wherein light emitted by a light emitting device is incident upon the first sub-wavelength grating in a direction substantially perpendicular to the thickness direction, and the first sub-wavelength grating passes the light and generates a 0th order light and ±1st order lights, a reflection-type second sub-wavelength grating is formed on the other of the surfaces of the substrate main body in the thickness direction, wherein the second sub-wavelength grating reflects and diffracts the 0th order light having passed through the first sub-wavelength grating, thereby generating the ±1st order lights advancing with a predetermined diffraction angle, and the second sub-wavelength grating is formed to face the first sub-wavelength grating in the thickness direction, and the ±1st order lights generated by the first sub-wavelength grating and the ±1st order lights generated by the second sub-wavelength grating are totally reflected by the one of the surfaces and the other of the surfaces.

Advantageous Effects of Invention

According to the present invention, while the light emitted by the light emitting device is totally reflected by both sides of the substrate main body in the thickness direction as the ±1st order lights generated by the first sub-wavelength grating and the ±1st order lights generated by the second sub-wavelength grating, the light propagates in the direction perpendicular to the thickness direction. Therefore, the light emitted by the light emitting device can propagate with as high efficiency as possible in such a manner that the light is confined. At the same time, the component returning to the light source as the 0th order light of the reflection-type second sub-wavelength grating can be reduced, which can stabilize the output of the light source.

DESCRIPTION OF EMBODIMENTS

Embodiments of the present invention will be hereinafter explained in detail with reference to the drawings.

Figure 1:
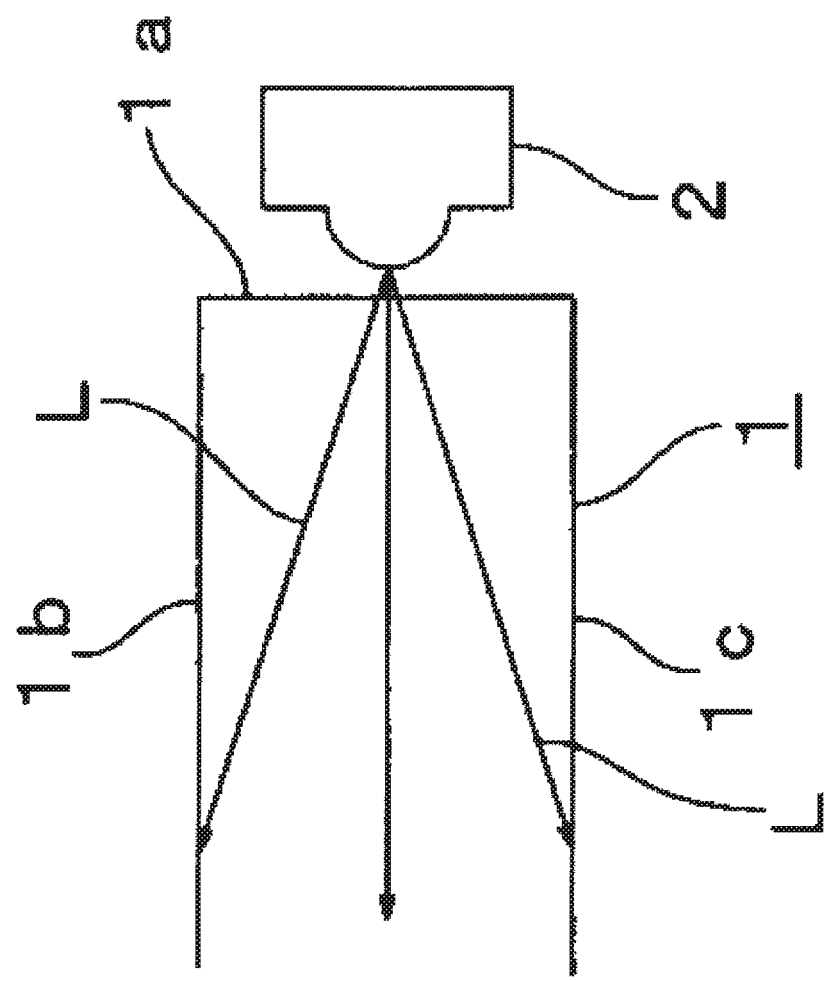
FIG. 1 is a schematic diagram illustrating an example of a light propagation method using a substrate employed in the past.
Figure 2:
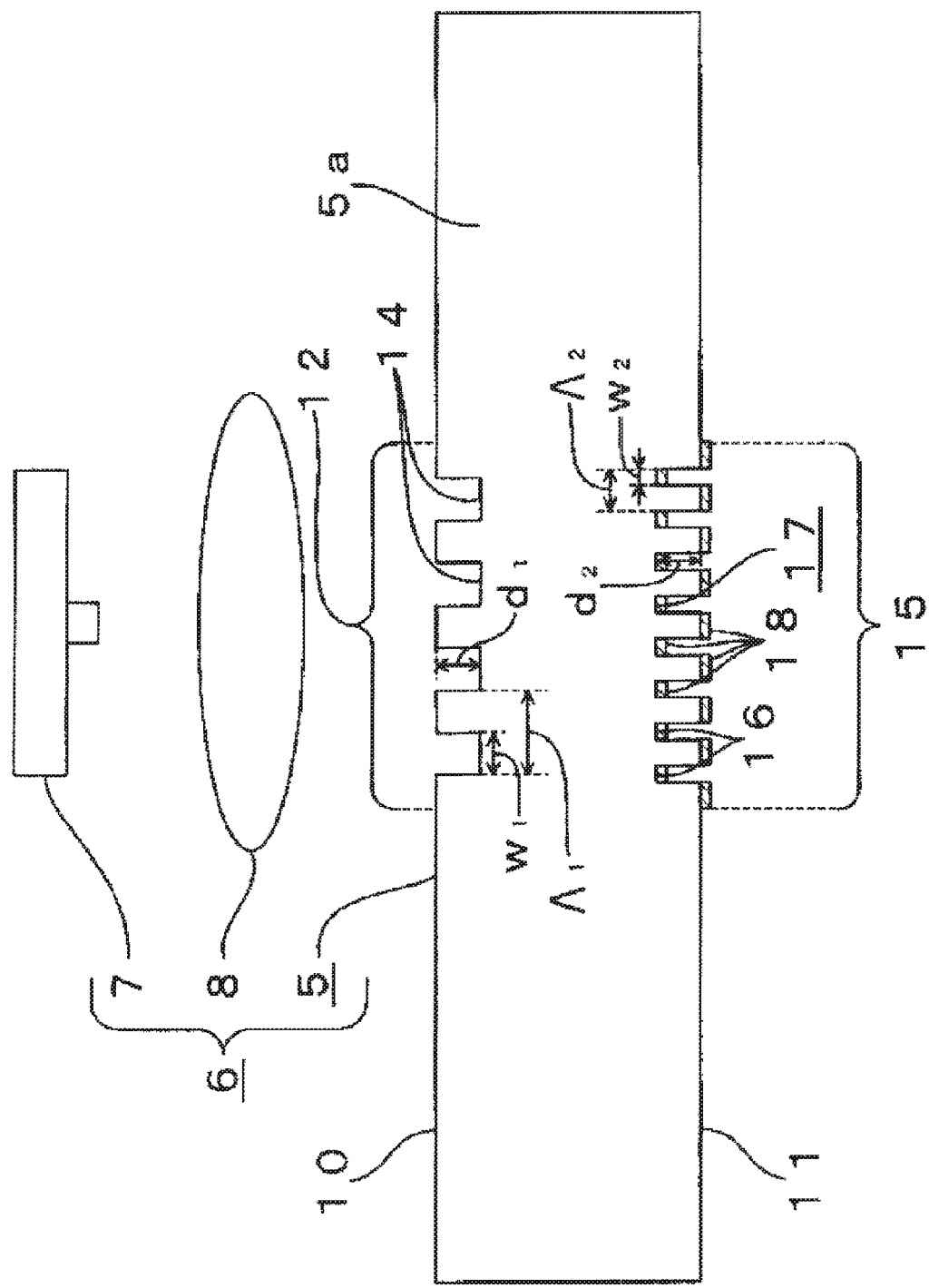
FIG. 2 is a configuration diagram illustrating Embodiment of a light guide substrate and an optical system according to the present invention.

As shown in FIG. 2, optical system 6 according to present embodiment includes light guide substrate 5 having a predetermined thickness, light emitting device 7 provided at an upper portion of FIG. 2 and facing light guide substrate 5, and collimation lens 8 provided between light guide substrate 5 and light emitting device 7. Light guide substrate 5, light emitting device 7, and collimation lens 8 are held at respective arrangement positions by known position holding unit (not shown).

Light emitting device 7 outputs (i.e., emits) light toward light guide substrate 5 (lower side of FIG. 2). Light emitting device 7 may be LED, LD, gas laser, solid-state laser, or the like.

Collimation lens 8 collimates the light output from light emitting device 7, and outputs the collimated light toward light guide substrate 5.

Figure 3:
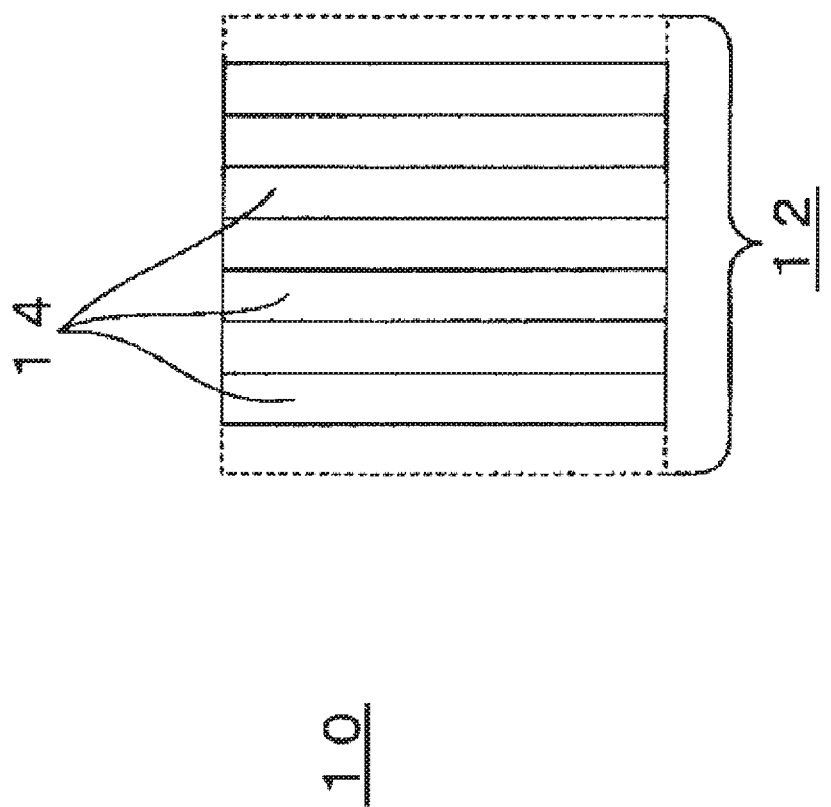
FIG. 3 is a top view illustrating the light guide substrate as shown in FIG. 2.
Figure 4:
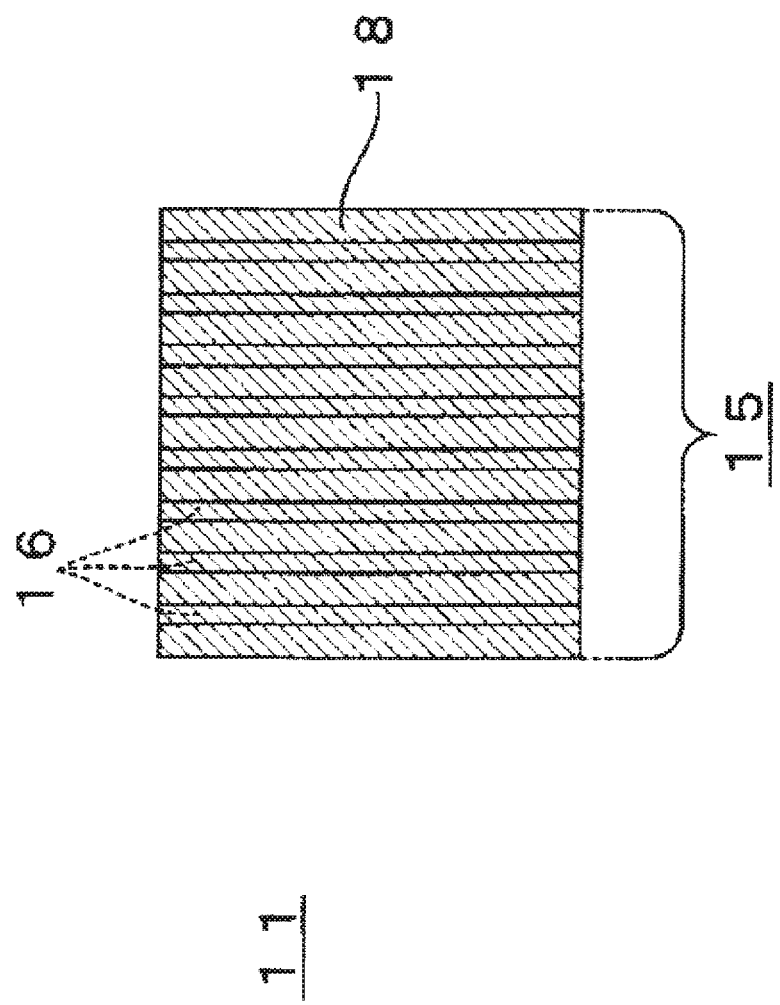
FIG. 4 is a bottom view illustrating the light guide substrate as shown in FIG. 2.

As shown in FIGS. 2 to 4, light guide substrate 5 has substrate main body 5a in a flat plate shape made of a transparent material having a predetermined thickness. Substrate main body 5a includes upper surface 10 provided perpendicular to a thickness direction, i.e., one of surfaces of substrate main body 5a in the thickness direction (vertical direction of FIG. 2), and lower surface 11 provided in parallel to upper surface 10, i.e., the other surface of the surfaces of substrate main body 5a in the thickness direction.

As shown in FIGS. 2 and 3, transparent first sub-wavelength grating 12 is formed in a region in a predetermined range at the center of upper surface 10 of substrate main body 5a. First sub-wavelength grating 12 has a plurality of grating grooves 14 formed to have a longer side in a direction perpendicular to the plane of the sheet showing FIG. 2 (vertical direction of FIG. 3) in such a manner that grating grooves 14 are arranged with a predetermined interval in a direction perpendicular to the longitudinal direction of grating grooves 14 (horizontal direction of FIGS. 2 and 3). First sub-wavelength grating 12 is formed as a fine cycle structure of which cycle $\Lambda_1$ is close to the wavelength of the light emitted by light emitting device 7. However, in addition to grating grooves 14, first sub-wavelength grating 12 may have a plurality of grating grooves formed perpendicular to grating grooves 14 in such a manner that the plurality of grating grooves are arranged in the direction perpendicular to the plane of the sheet showing FIG. 2.

Figure 5:
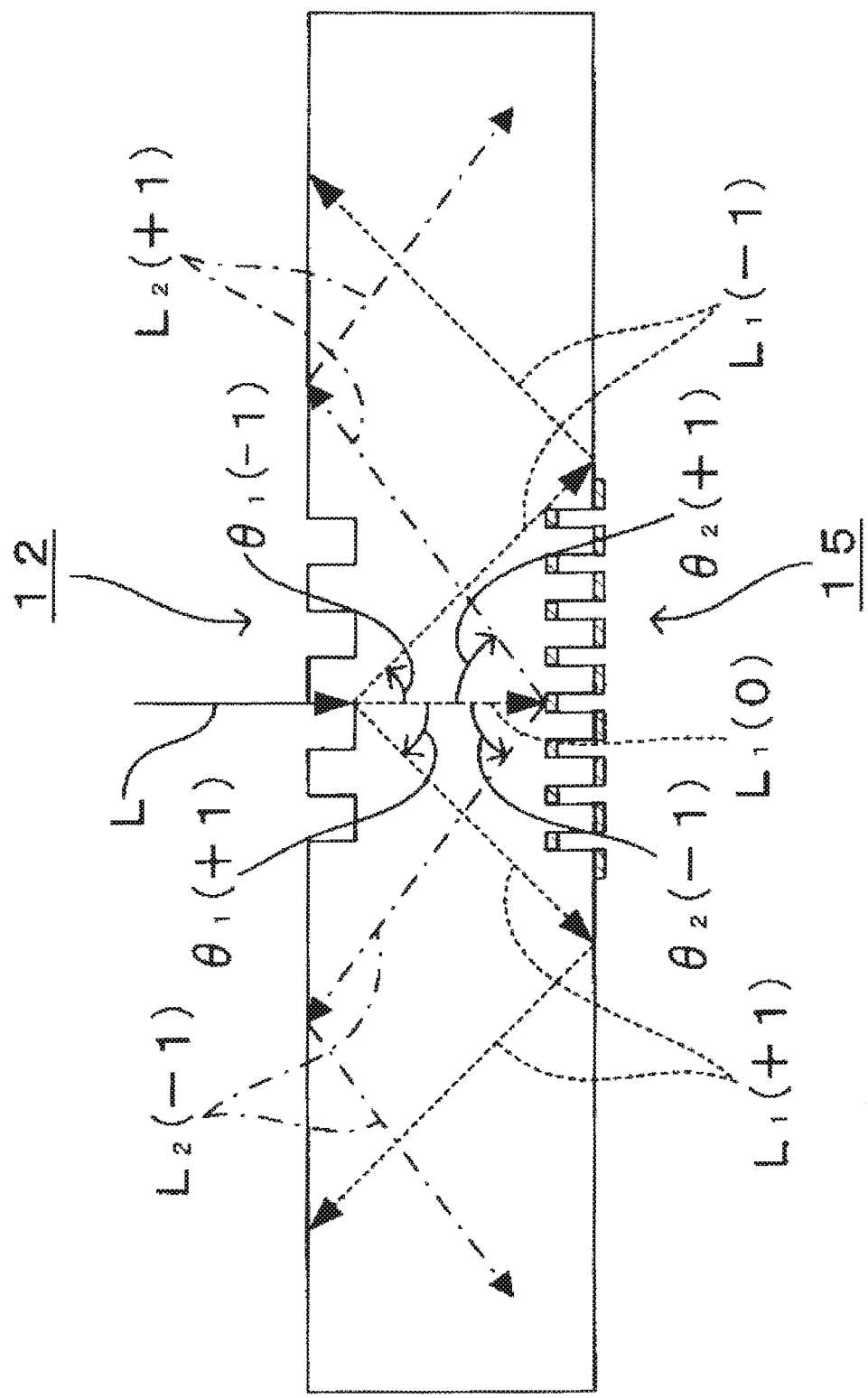
FIG. 5 is a schematic diagram illustrating an optical path of light incident upon a first sub-wavelength grating in Embodiment of the light guide substrate according to the present invention.

As shown in FIG. 5, light L emitted from light emitting device 7 and collimated by collimation lens 8 enters into first sub-wavelength grating 12 in the vertical direction from the upper side of FIG. 2. Then, first sub-wavelength grating 12 passes the incident light L. The light having passed through first sub-wavelength grating 12 generates the 0th order light $L_1(0)$ substantially in parallel to light L and the +1st order light $L_1(+1)$ and the −1st order light $L_1(-1)$ advancing with a predetermined diffraction angle with respect to light L.

As shown in FIGS. 2 and 4, second sub-wavelength grating 15 of reflection type is formed on lower surface 11 of substrate main body 5a at a position facing first sub-wavelength grating 12 in the thickness direction, i.e., in the region in the predetermined range at the center of lower surface 11. Second sub-wavelength grating 15 has a structure of lattice shape 17 having a plurality of grating grooves 16 formed to have a longer side in a direction perpendicular to the plane of the sheet showing FIG. 2 (vertical direction of FIG. 4) in such a manner that grating grooves 16 are arranged with a predetermined interval in a direction perpendicular to the longitudinal direction of grating grooves 16 (horizontal direction of FIGS. 2 and 4). Cycle $\Lambda_2$ of lattice shape 17 is formed as a cycle less than cycle $\Lambda_1$ of first sub-wavelength grating 12, and cycle $\Lambda_2$ corresponds to the cycle of second sub-wavelength grating 15 itself. However, like first sub-wavelength grating 12, second sub-wavelength grating 15 may have not only grating grooves 16 but also a plurality of grating grooves formed perpendicular to grating grooves 16 in such a manner that the plurality of grating grooves are arranged in the direction perpendicular to the plane of the sheet showing FIGS. 2 and 4. Further, as shown in FIGS. 2 and 4, second sub-wavelength grating 15 has metallic thin film 18 formed in portions of the surface of lattice shape 17 that are parallel to lower surface 11 (i.e., on the bottom surfaces of grating grooves 16 and surfaces of lattice shape 17 in which no grating groove 16 is formed).

As shown in FIG. 5, the 0th order light $L_1(0)$ generated by first sub-wavelength grating 12 is incident upon second sub-wavelength grating 15. Then, second sub-wavelength grating 15 diffracts the incident 0th order light $L_1(0)$, thereby generating the +1st order light $L_2(+1)$ and the −1st order light $L_2(-1)$ advancing with the predetermined diffraction angle.

In light guide substrate 5 according to present embodiment thus formed, the +1st order light $L_1(+1)$ and the −1st order light $L_1(-1)$ generated by first sub-wavelength grating 12 and the +1st order light $L_2(+1)$ and the −1st order light $L_2(-1)$ generated by second sub-wavelength grating 15 propagate in the direction perpendicular to the thickness direction of light guide substrate 5 while being totally reflected by upper surface 10 and lower surface 11 of substrate main body 5a.

This will be explained more specifically. First, as shown in FIG. 5, the 0th order light $L_1(0)$ generated by first sub-wavelength grating 12 advances inside substrate main body 5a while maintaining the path in the same direction as light L incident upon first sub-wavelength grating 12 toward second sub-wavelength grating 15 (downward direction of FIG. 5). At this occasion, the +1st order light $L_1(+1)$ generated by first sub-wavelength grating 12 advances inside substrate main body 5a toward lower surface 11 of substrate main body 5a with predetermined diffraction angle $\theta_1(+1)$ [degrees] in the clockwise direction of FIG. 5 with respect to the 0th order light $L_1(0)$. In addition, at this occasion, the −1st order light $L_1(-1)$ generated by first sub-wavelength grating 12 advances inside substrate main body 5a toward lower surface 11 of substrate main body 5a with predetermined diffraction angle $\theta_1(-1)$ [degrees] in the counterclockwise direction of FIG. 5 with respect to the 0th order light $L_1(0)$. However, diffraction angle $\theta_1(-1)$ of the −1st order light $L_1(-1)$ is the same as diffraction angle $\theta_1(+1)$ of the +1st order light $L_1(+1)$.

Subsequently, the 0th order light $L_1(0)$ having reached second sub-wavelength grating 15 is diffracted by second sub-wavelength grating 15, whereby the light is converted into the reflected 0th order light, the reflected +1st order light $L_2(+1)$, and the reflected −1st order light $L_2(-1)$. At this occasion, the +1st order light $L_1(+1)$ generated by first sub-wavelength grating 12 and having reached lower surface 11 of substrate main body 5a is incident upon lower surface 11 with an incidence angle equal to or more than a critical angle, i.e., $|\theta_1(+1)|$, and is totally reflected by lower surface 11. In addition, at this occasion, the −1st order light $L_1(-1)$ generated by first sub-wavelength grating 12 and having reached lower surface 11 of substrate main body 5a is incident upon lower surface 11 with an incidence angle equal to or more than a critical angle, i.e., $|\theta_1(-1)|$, and is totally reflected by lower surface 11.

Subsequently, the +1st order light $L_2(+1)$ generated by second sub-wavelength grating 15 advances inside substrate main body 5a toward upper surface 10 of substrate main body 5a with predetermined diffraction angle $\theta_2(+1)$ [degrees] in the clockwise direction of FIG. 5 with respect to the 0th order light $L_1(0)$. At this occasion, the −1st order light $L_2(-1)$ generated by second sub-wavelength grating 15 advances inside substrate main body 5a toward upper surface 10 of substrate main body 5a with predetermined diffraction angle $\theta_2(-1)$ [degrees] in the counterclockwise direction of FIG. 5 with respect to the 0th order light $L_1(0)$. However, diffraction angle $\theta2(-1)$ of the −1st order light $L_2(-1)$ is the same as diffraction angle $\theta_2(+1)$ of the +1st order light $L_2(+1)$. In addition, at this occasion, the +1st order light $L_1(+1)$ generated by first sub-wavelength grating 12 and totally reflected by lower surface 11 of substrate main body 5a advances inside substrate main body 5a toward upper surface 10 of substrate main body 5a. Further, at this occasion, the −1st order light $L_1(-1)$ generated by first sub-wavelength grating 12 and totally reflected by lower surface 11 of substrate main body 5a advances inside substrate main body 5a toward upper surface 10 of substrate main body 5a.

Subsequently, the +1st order light $L_2(+1)$ generated by second sub-wavelength grating 15 and having reached upper surface 10 of substrate main body 5a is incident upon upper surface 10 with an incidence angle equal to or more than a critical angle, i.e., $|\theta_2(+1)|$, and is totally reflected by upper surface 10. At this occasion, the −1st order light $L_2(-1)$ generated by second sub-wavelength grating 15 and having reached upper surface 10 of substrate main body 5a is incident upon upper surface 10 with an incidence angle equal to or more than a critical angle, i.e., $|\theta_2(-1)|$, and is totally reflected by upper surface 10. In addition, at this occasion, the +1st order light $L_1(+1)$ generated by first sub-wavelength grating 12 and having reached upper surface 10 of substrate main body 5a is incident upon upper surface 10 with an incidence angle equal to or more than a critical angle, i.e., $|\theta_1(+1)|$, and is totally reflected by upper surface 10. Further, at this occasion, the −1st order light $L_1(-1)$ generated by first sub-wavelength grating 12 and having reached upper surface 10 of substrate main body 5a is incident upon upper surface 10 with an incidence angle equal to or more than a critical angle, i.e., $|\theta_1(-1)|$, and is totally reflected by upper surface 10.

It should be noted that, thereafter, while the +1st order light $L_1(+1)$ generated by first sub-wavelength grating 12 is repeatedly, totally reflected between lower surface 11 and upper surface 10 of substrate main body 5a, the light propagates inside substrate main body 5a in the direction perpendicular to the thickness direction, i.e., toward the left side of FIG. 5. On the other hand, while the −1st order light $L_1(-1)$ generated by first sub-wavelength grating 12 is repeatedly, totally reflected between lower surface 11 and upper surface 10 of substrate main body 5a, the light propagates inside substrate main body 5a in the direction perpendicular to the thickness direction, i.e., toward the right side of FIG. 5. Further, while the +1st order light $L_2(+1)$ generated by second sub-wavelength grating 15 is repeatedly, totally reflected between lower surface 11 and upper surface 10 of substrate main body 5a, the light propagates inside substrate main body 5a in the direction perpendicular to the thickness direction, i.e., toward the right side of FIG. 5. Still further, while the −1st order light $L_2(-1)$ generated by second sub-wavelength grating 15 is repeatedly, totally reflected between lower surface 11 and upper surface 10 of substrate main body 5a, the light propagates inside substrate main body 5a in the direction perpendicular to the thickness direction, i.e., toward the left side of FIG. 5. In other words, the +1st order light $L_1(+1)$ and the −1st order light $L_1(-1)$ generated by first sub-wavelength grating 12 propagate in the direction opposite from each other in the direction perpendicular to the thickness direction. Likewise, the +1st order light $L_2(+1)$ and the −1st order light $L_2(-1)$ generated by second sub-wavelength grating 15 propagate in the direction opposite from each other in the direction perpendicular to the thickness direction.

In this configuration, while light L emitted by light emitting device 7 is totally reflected by upper surface 10 and lower surface 11 of substrate main body 5a as the ±1st order lights $L_1(+1)$, $L_1(-1)$ generated by first sub-wavelength grating 12 and the ±1st order lights $L_2(+1)$, $L_2(-1)$ generated by second sub-wavelength grating 15, the light can propagate in the direction perpendicular to the thickness direction. As a result, the light emitted by light emitting device 7 can propagate with as high efficiency as possible in such a manner that the light is confined in light guide substrate 5. Further, only a small fraction of component of the 0th order light $L_1(0)$ that is generated by first sub-wavelength grating 12 and further diffracted by second sub-wavelength grating 15 returns back to first sub-wavelength grating 12 as the reflected 0th order light $L_2(0)$ (not shown). Then, only a component of the 0th order light that first sub-wavelength grating 12 generates by further diffracting the 0th order light $L_2(0)$ returned to first sub-wavelength grating 12 passes through upper surface 10 of substrate main body 5a, and returns back to the light source. Since this component is extremely small, it can be said that the light returning to the light source is substantially completely prevented.

In addition to the above configuration, further, it is desirable to satisfy the conditional equation as shown in equation 1 below.

$$h \cdot \tan[\min(\theta, \theta')] \geq 2w \quad \text{(Equation 1)}$$

In equation 1, h denotes the thickness of light guide substrate 5. In equation 1, $\theta$ denotes diffraction angle $\theta_1(+1)=\theta_1(-1)$ [degrees] of the ±1st order lights $L_1(+1)$, $L_1(-1)$ generated by first sub-wavelength grating 12. In equation 1, $\theta'$ denotes diffraction angle $\theta_2(+1)=\theta_2(-1)$ [degrees] of the ±1st order lights $L_2(+1)$, $L_2(-1)$ generated by second sub-wavelength grating 15. In equation 1, min ($\theta$, $\theta'$) denotes one of $\theta$ and $\theta'$ that has a smaller value. In equation 1, w denotes a beam diameter of light L emitted by light emitting device 7 and incident upon first sub-wavelength grating 12.

This configuration can prevent incidence of the ±1st order lights $L_1(+1)$, $L_1(-1)$ generated by first sub-wavelength grating 12 upon second sub-wavelength grating 15 and incidence of the ±1st order lights $L_2(+1)$, $L_2(-1)$ generated by second sub-wavelength grating 15 upon first sub-wavelength grating 12. As a result, the loss of light due to the transmitted diffraction light and the loss of light due to change of the diffraction angle are prevented, and the light emitted by light emitting device 7 can propagate in such a manner that the light is more appropriately confined.

EMBODIMENT

Subsequently, a method for designing light guide substrate 5 and optical system 6 will be explained as Embodiment of the present invention.

In present embodiment, initially, a substrate for confining light (i.e., substrate used as substrate main body 5a) is defined to be a resin substrate. However, the substrate is not necessarily made of resin. It may be made of other optical materials such as glass and ceramics. In present embodiment, a resin called Zeonex-480R manufactured by Zeon Corporation is used as the resin for the resin substrate. Further, in present embodiment, calculation is performed while light L emitted by light emitting device 7 is assumed to be red light having wavelength $\lambda$ of 650 nm. However, lights having other wavelengths (e.g., blue light) may also be used. It should be noted that Zeonex-480R has a refractive index of about 1.525 with respect to light having a wavelength of 650 nm.

In this case, Fresnel equation as shown in equation 2 below holds at an interface position between a first medium and a second medium which have refractive indexes different from each other.

$$\sin\theta_1/\sin\theta_2 = n_1/n_2 \quad \text{(Equation 2)}$$

However, $\theta_1$ in equation 2 denotes an incidence angle [degrees] of light that is incident from the first medium upon the interface between the first medium and the second medium. On the other hand, $\theta_2$ in equation 2 denotes an output angle [degrees] at which the light incident from the first medium upon the interface between the first medium and the second medium is output from the interface toward the second medium. Further, $n_1$ in equation 2 denotes the refractive index of the first medium. Still further, $n_2$ in equation 2 denotes the refractive index of the second medium.

Where it is assumed the first medium is the resin substrate, and the second medium is air in equation 2, an angle of 40.972 degrees is calculated as critical angle $\theta c$ [degrees] from the equation below.

$$\sin\theta c = 1/1.525 \quad \text{(Equation 3)}$$

Then, while the light incident from the resin substrate upon the air with an angle larger than critical angle $\theta c$ is totally reflected by the interface between the resin substrate and the air, the light propagates through the inside of the resin substrate in such a manner that the light is confined inside of the resin substrate.

Subsequently, in present embodiment, in order to ensure propagation of the light inside the resin substrate, first sub-wavelength grating 12 is provided on the front surface of the resin substrate (corresponding to upper surface 10 of substrate main body 5a). It should be noted that first sub-wavelength grating 12 according to present embodiment can be formed integrally with the resin substrate by resin molding method using a die.

In this case, in general, the term "sub-wavelength grating" is known to be a term used for a grating whose cycle (spacial cycle) is about the same size as the wavelength of the used light or less than the wavelength. First sub-wavelength grating 12 according to present embodiment is also a grating having the same meaning as such term used in general.

Further, in general, a grating is known to satisfy a grating equation shown in equation below.

$$\Lambda \sin\theta = n\lambda \quad \text{(Equation 4)}$$

However, $\Lambda$ in equation 4 is the cycle of the grating. In the equation 4, $\theta$ denotes the diffraction angle of the diffraction light of the grating. In the equation 4, n denotes the diffraction order of the diffraction light. In the equation 4, $\lambda$ denotes the wavelength of the light incident upon the grating (light diffracted by the grating).

In general, the sub-wavelength grating is different from an ordinary grating whose cycle $\Lambda$ is larger than the cycle of the sub-wavelength grating. The diffraction light generated by the sub-wavelength grating has a lower diffraction order, i.e., the sub-wavelength grating generates only the ±1st order light and the 0th order light, or only the 0th order light. However, in present embodiment, light guide substrate 5 is provided to generate the ±1st order lights $L_1(+1)$, $L_1(-1)$ and the 0th order light $L_1(0)$ with first sub-wavelength grating 12.

Subsequently, based on the assumption of the characteristics of the generally-available grating and the sub-wavelength grating, the following equation is obtained as a condition where the +1st order light $L_1(+1)$ generated by first sub-wavelength grating 12 is incident upon the back surface of the resin substrate (corresponding to lower surface 11 of substrate main body 5a) with a larger incidence angle than the critical angle.

$$\Lambda_1 \leq \lambda/\sin\theta = 0.65/\sin(40.97 \text{ degrees}) = 0.9991 \text{ μm} \quad \text{(Equation 5)}$$

However, $\lambda$ and $\theta$ in equation 5 are the same as those in equation 4. In equation 5, $\Lambda_1$ denotes the cycle of first sub-wavelength grating 12 (see FIG. 2).

As can be understood from equation 5, when the resin substrate made of Zeonex-480R is used at the wavelength $\lambda$ of 650 nm, the +1st order light $L_1(+1)$ is confined within the resin substrate as long as the cycle $\Lambda_1$ of first sub-wavelength grating 12 is about 1 μm or less.

However, even when equation 5 is satisfied, only the 0th order light is generated when the size becomes $\Lambda_1\lambda/n = 0.65/1.525 = 0.426$ μm. Therefore, in present embodiment, light guide substrate 5 and optical system 6 are designed to further satisfy the following equation.

$$0.426 \text{ μm} \leq \Lambda_1 \leq 0.9991 \text{ μm} \quad \text{(Equation 6)}$$

Further, even when equation 6 is satisfied, change of the phase of first sub-wavelength grating 12 results in change of the power distribution of the diffraction efficiency between the ±1st order and the 0th order. For this reason, it is necessary to obtain a phase that yields as high diffraction efficiency as possible in the ±1st order. This kind of condition is called Bragg condition. This kind of phase can be obtained by determining (fixing) wavelength $\lambda$ of the light incident upon first sub-wavelength grating 12 and cycle $\Lambda_1$ and filling factor $f_1$ of first sub-wavelength grating 12 and controlling depth $d_1$ of grating groove 14 of first sub-wavelength grating 12 (see FIG. 2).

However, in a case of first sub-wavelength grating 12 as shown in FIG. 2, filling factor $f_1$ can be expressed by the following equation using cycle $\Lambda_1$ and groove width $w_1$ in the direction in which grating groove 14 is arranged (see FIG. 2).

$$f_1 = (\Lambda_1 - w_1)/\Lambda_1 \qquad \text{(Equation 7)}$$

In this case, in general, the diffraction efficiency of the grating is known to be calculated by methods such as Fourier modal method and RCWA method. However, the RCWA method stands for Rigorous Coupled Wave Analysis. The details of this RCWA method are described by M. G. Moharam in J. Opt. Soc. Am, A 12 (5): 1077-1086 May 1995. G-solver sold by Grating solver Development Co., in the United States and DiffractMOD sold by R-Soft Design group in the United States are known as software employing the RCWA method for calculating the diffraction efficiency of the grating.

Figure 6:
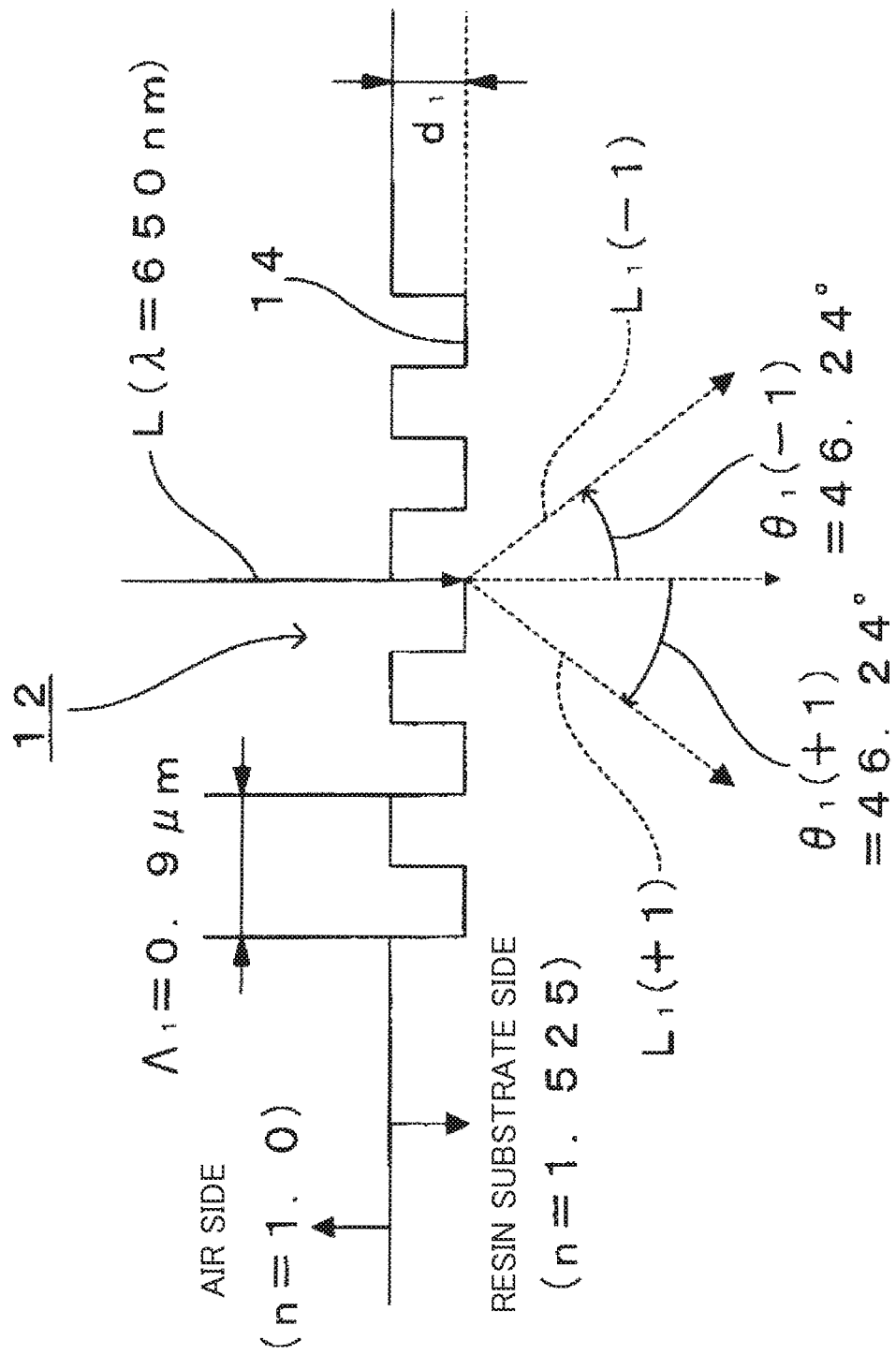
FIG. 6 is an explanatory diagram for illustrating a method for designing a first sub-wavelength grating in Embodiment of the light guide substrate according to the present invention.

In present embodiment, the diffraction efficiency of first sub-wavelength grating 12 is calculated using such known calculation method for calculating the diffraction efficiency. More specifically, as shown in FIG. 6, the diffraction efficiency of first sub-wavelength grating 12 is calculated where wavelength $\lambda$ of light L incident upon first sub-wavelength grating 12 is 650 nm, refractive index n of first sub-wavelength grating 12 is 1.525, cycle $\Lambda_1$ of first sub-wavelength grating 12 is 0.9 µm, and filling factor $f_1$ of first sub-wavelength grating 12 is 0.4, wherein collimated light L is incident from the air upon first sub-wavelength grating 12. However, the parameter (variable) used in the calculation is depth $d_1$ of grating groove 14. In present embodiment, depth $d_1$ of grating groove 14 is changed from 0 to 0.8 µm. In this calculation, ten Fourier expansion terms of the dielectric constant are used in the RCWA method. In this calculation, it is assumed that linear polarized TE light (i.e., light L) is incident upon first sub-wavelength grating 12. The calculation result thereof is shown in the graph of FIG. 7.

Figure 7:
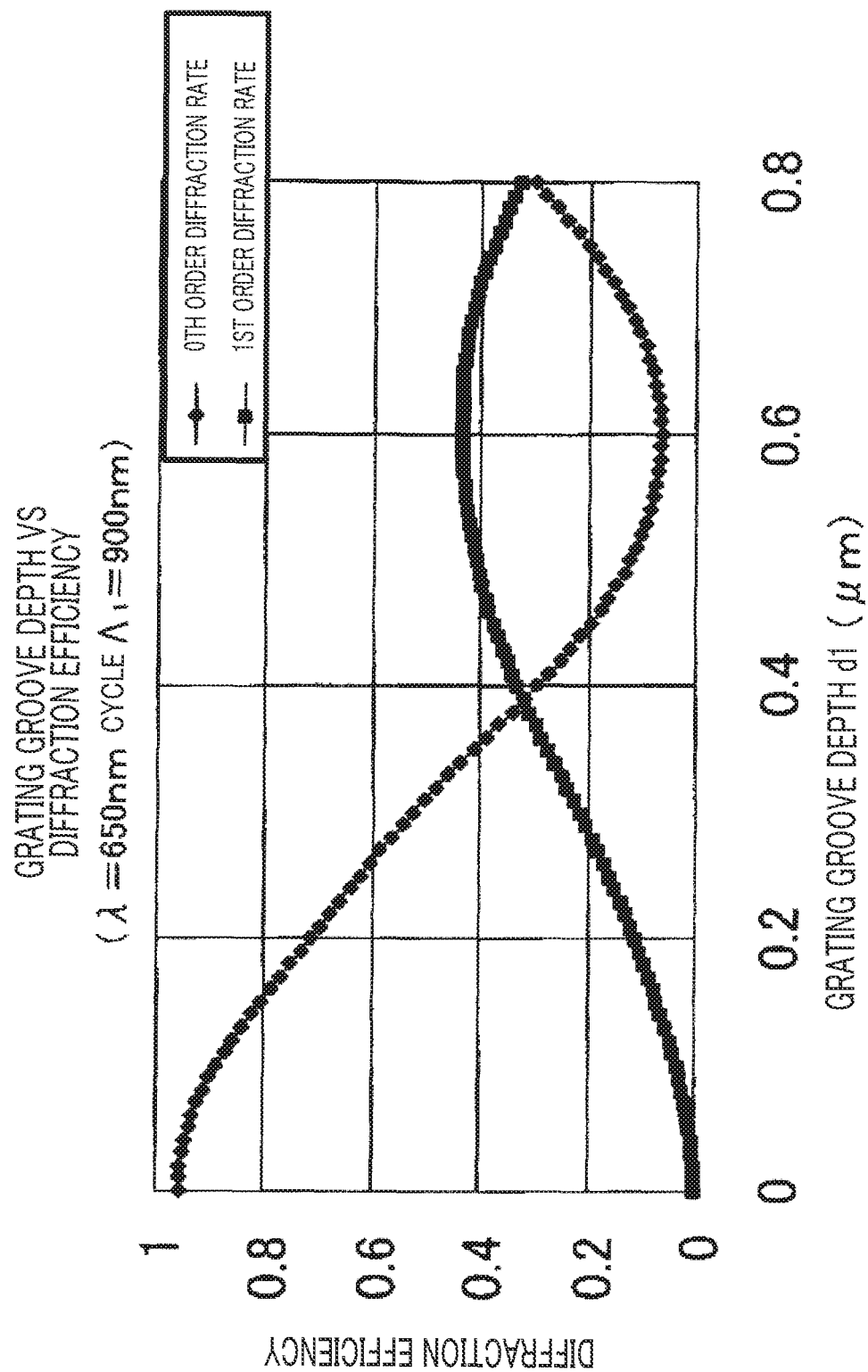
FIG. 7 is a graph illustrating a calculation result of diffraction efficiency of the first sub-wavelength grating in Embodiment of the light guide substrate according to the present invention.

FIG. 7 shows a graph representing the calculation result of the diffraction efficiency of first sub-wavelength grating 12 calculated under the calculation condition as shown in FIG. 6. In FIG. 7, the value of the horizontal axis represents depth $d_1$ [µm] of grating groove 14, and the values of the vertical axis represent the 0th and ±1st diffraction efficiencies. In FIG. 7, the +1st order diffraction efficiency and the −1st order diffraction efficiency have the same characteristic as each other.

As shown in FIG. 7, when depth $d_1$ of grating groove 14 is 0.60 µm, it is understood that the summation of the ±1st order diffraction efficiencies is about 86.6%. At this occasion, the 0th order diffraction efficiency is about 6.38%. Further, at this occasion, the ±1st order lights $L_1(+1)$, $L_1(-1)$ generated by first sub-wavelength grating 12 are diffracted with a diffraction angle of 46.24 degrees as shown in FIG. 6. The diffraction angle is larger than the critical angle of 40.92 degrees with which the light is incident from the resin substrate upon the air. Therefore, when the ±1st order lights $L_1(+1)$, $L_1(-1)$ advance inside the resin substrate, and reach the back surface of the resin substrate, the lights are totally reflected by the back surface. Thereafter, while the lights are repeatedly, totally reflected by the interface between the resin substrate and the air, the lights propagate within the resin substrate. Therefore, under the calculation condition of FIG. 6, first sub-wavelength grating 12 having the optimum diffraction efficiency can be obtained when $d_1$ is 0.60 µm.

Figure 8:
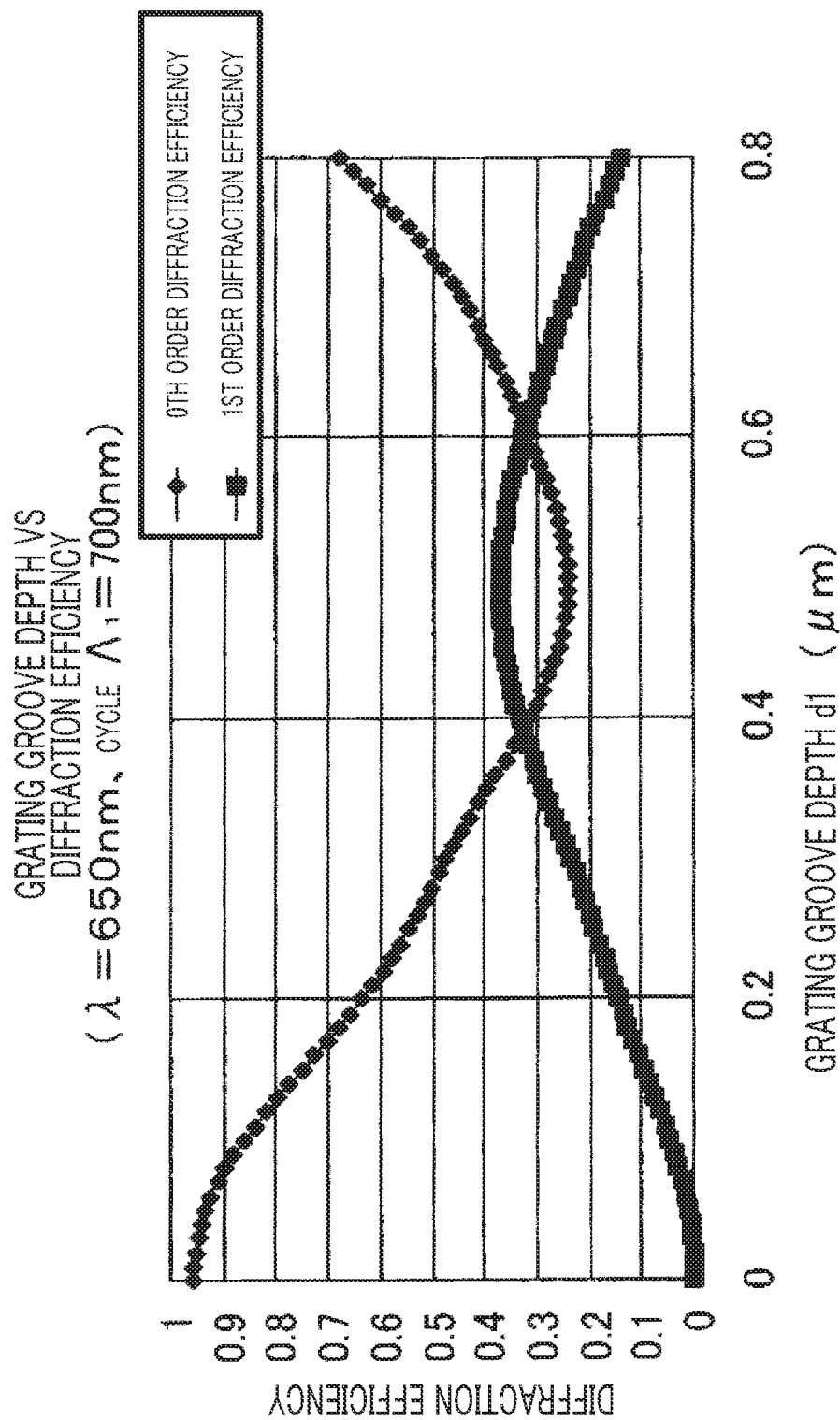
FIG. 8 is a graph illustrating a calculation result of diffraction efficiency of a first sub-wavelength grating as a modification of FIG. 7 in Embodiment of the light guide substrate according to the present invention.

By the way, FIG. 8 shows a calculation result of diffraction efficiency when depth $d_1$ of grating groove 14 is changed by setting cycle $\Lambda_1$ of first sub-wavelength grating 12 to 0.7 µm by slightly changing the calculation condition from that shown in FIG. 7. In this case, first sub-wavelength grating 12 has a small amount of diffraction efficiency of reflection caused by Fresnel reflection. More specifically, the summation of the ±1st order diffraction efficiencies of the reflections is 4.0%, and the summation of the ±0th order diffraction efficiencies of the reflections is 0.3%. This 4% becomes insertion loss, but when first sub-wavelength grating 12 is coated with a reflection prevention film, this value can be reduced to an extremely low level.

As shown in FIG. 8, when cycle $\Lambda_1$ of first sub-wavelength grating 12 is set as 0.7 µm, the diffraction angle of the 1st order light is 68.2 degrees, which is larger than that of FIG. 6. On the other hand, however, the 1st order diffraction efficiency is no more than 74.07% at a maximum when depth $d_1$ of grating groove is 0.49 µm, which is less than that of FIG. 7 by 10% or more. Therefore, first sub-wavelength grating 12 having the characteristics as shown in FIG. 7 is relatively more suitable for light propagation than that shown in FIG. 8.

However, first sub-wavelength grating 12 as shown in FIG. 7 also has a problem that the diffraction efficiency of the 0th order light $L_1(0)$ is 6.38%. When nothing is done, when the 0th order light $L_1(0)$ reaches the back surface of the resin substrate, substantially the entire component except a portion of the component Fresnel-reflected by the back surface passes through the resin substrate from the back surface and goes out to the air. Then, the light going out to the air cannot be confined within the resin substrate.

For this issue, in present embodiment is configured, not only first sub-wavelength grating 12 but also second sub-wavelength grating 15 are designed in order to suppress transmission of the 0th order light $L_1(0)$ at the back surface of the resin substrate, wherein second sub-wavelength grating 15 is at a position of the back surface of the resin substrate facing first sub-wavelength grating 12 in the thickness direction of the resin substrate.

Figure 9:
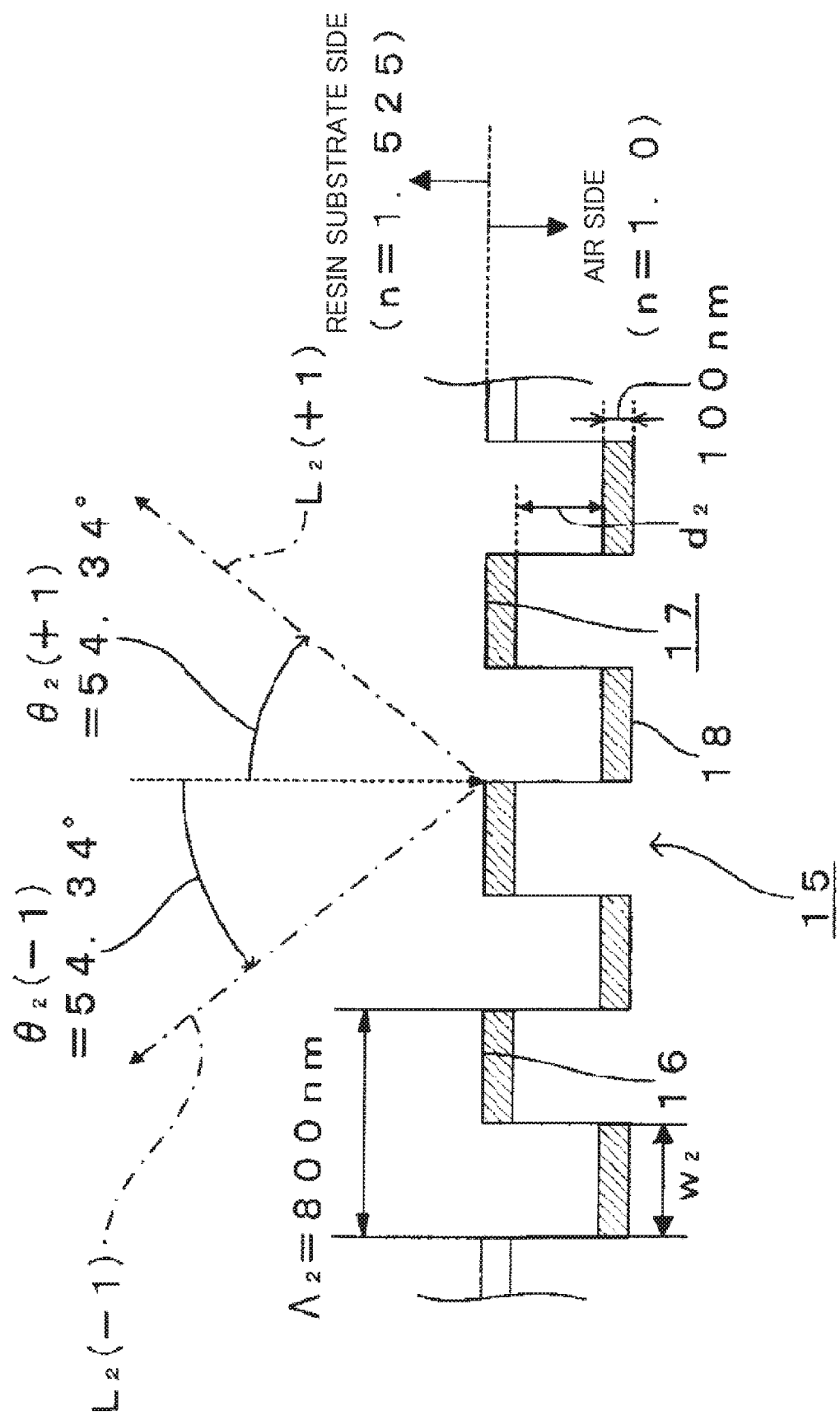
FIG. 9 is an explanatory diagram for illustrating a method for designing a second sub-wavelength grating in Embodiment of the light guide substrate according to the present invention.

More specifically, as shown in FIG. 9, a structure of lattice shape 17 in which plurality of grating grooves 16 are arranged are designed at positions on the back surface of the resin substrate facing first sub-wavelength grating 12 in the thickness direction, and metallic thin films 18 are arranged on the surface of the lattice shape 17 at positions parallel to the back surface of the resin substrate. In present embodiment, metallic thin film 18 may be formed by known deposition methods such as metal evaporation and sputtering.

In present embodiment, metallic thin film 18 may be formed with aluminum. However, metallic thin film 18 may be formed with a material other than aluminum such as gold, silver, or dielectric multilayer film. In present embodiment, the cycle $\Lambda_2$ of second sub-wavelength grating 15 (i.e., cycle of lattice shape 17) is 800 nm, and filling factor $f_2$ of second sub-wavelength grating 15 is 0.4.

However, in a case of second sub-wavelength grating 15 as shown in FIGS. 2 and 9, filling factor $f_2$ can be expressed as the following equation using cycle $\Lambda_2$ and groove width $w_2$ in which grating grooves 16 are arranged (see FIG. 2, FIG. 9).

$$f_2 = (\Lambda_2 - w_2)/\Lambda_2 \qquad \text{(Equation 8)}$$

In present embodiment, the diffraction efficiency of second sub-wavelength grating 15 is calculated by the same method as the calculation method for calculating the diffraction efficiency of first sub-wavelength grating 12 under the calculation condition of FIG. 9. However, in this calculation, depth $d_2$ (see FIG. 2, FIG. 9) [µm] of grating groove 16 is adopted as a variable, and the value of $d_2$ is changed in the range between 0 and 1 µm. In this case, the film thickness of metallic thin film 18 made of aluminum is constant, i.e., 100 nm. In this calculation, the wavelength of the light is 650 nm, which is the same wavelength as that obtained when the diffraction efficiency of first sub-wavelength grating 12 is calculated. FIG.

10 shows a calculation result of diffraction efficiency of second sub-wavelength grating 15 calculated under such calculation condition.

Figure 10:
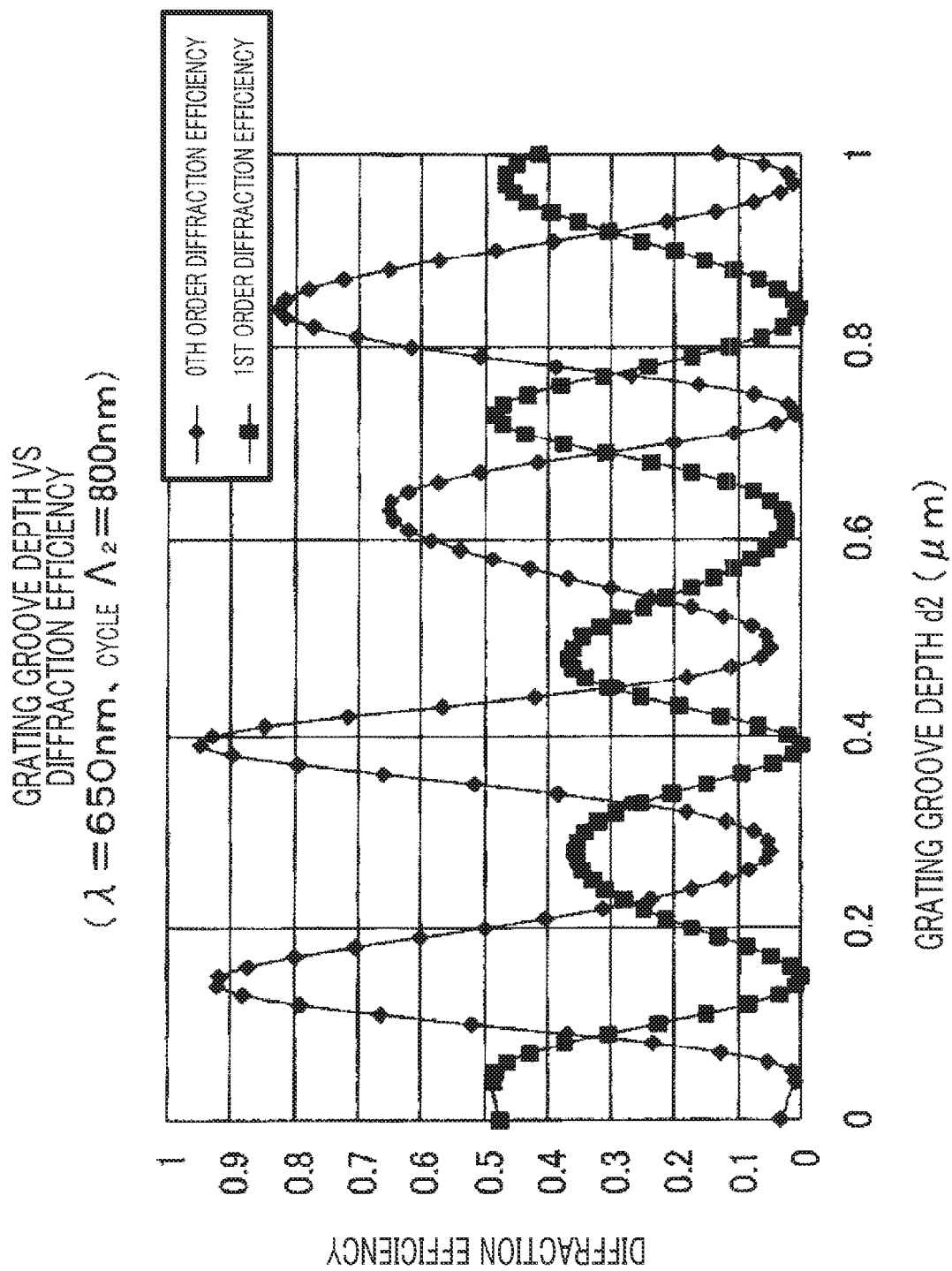
FIG. 10 is a graph illustrating a calculation result of diffraction efficiency of the second sub-wavelength grating in Embodiment of the light guide substrate according to the present invention.

FIG. 10 shows a graph representing the calculation result of the diffraction efficiency of second sub-wavelength grating 15 calculated under the calculation condition as shown in FIG. 9. In FIG. 10, the values of the horizontal axis represent depth $d_2$ [μm] of grating groove 16, and the values of the vertical axis represent the 0th and ±1st diffraction efficiencies. In FIG. 10, the +1st order diffraction efficiency and the −1st order diffraction efficiency have the same characteristic as each other.

As shown in FIG. 10, the 0th order diffraction efficiency and the ±1st order diffraction efficiencies have such characteristics that they repeatedly increase and decrease according to change of depth $d_2$ of grating groove 16. As shown in FIG. 10, the ±1st order diffraction efficiencies tend to decrease in the range of depth $d_2$ of grating groove 16 in which the 0th order diffraction efficiency tends to increase. On the contrary, the ±1st order diffraction efficiencies tend to increase in the range of depth $d_2$ of grating groove 16 in which the 0th order diffraction efficiency tends to decrease. Further, as shown in FIG. 10, when $d_2$ is 0.73 μm, the 0th order diffraction efficiency is the minimum value, i.e., 0.86%, and at this occasion, the summation of the diffraction efficiencies of the ±1st order lights is the maximum value, i.e., 96.52%. Still further, the diffraction angle of the ±1st order lights $L_2(+1)$, $L_2(-1)$ of second sub-wavelength grating 15 are 54.34 degrees, and this diffraction angle is larger than the critical angle, i.e., 40.92 degrees, with which the light is incident from the resin substrate upon the air. Therefore, when the ±1st order lights $L_2(+1)$, $L_2(-1)$ advance inside of the resin substrate and reach the surface of the resin substrate, the lights are totally reflected by the surface. Thereafter, while the lights are repeatedly, totally reflected by the interface between the resin substrate and the air, the lights propagate within the resin substrate. Therefore, under the calculation condition of FIG. 9, second sub-wavelength grating 15 having the optimum diffraction efficiency can be obtained when $d_2$ is 0.73 μm and the film thickness of aluminum is 100 nm.

Further, in present embodiment, the entire configuration of optical system 6 is designed. That is, in present embodiment, the LD emitting light having a wavelength λ of 650 nm is provided as light emitting device 7 at the position facing first sub-wavelength grating 12 in order to achieve the optimum diffraction efficiency of first sub-wavelength grating 12 and second sub-wavelength grating 15 explained above. The LD according to present embodiment is a can-type laser having a divergence angle NA of about 0.6. In present embodiment, collimation lens 8 made of an aspheric lens is provided between first sub-wavelength grating 12 and the LD. However, in present embodiment, collimation lens 8 is provided at a position away from the LD by focal length f of the light emitted from the LD (i.e., laser light), so that the light emitted by the LD can be made into parallel light by collimation lens 8.

Figure 11:
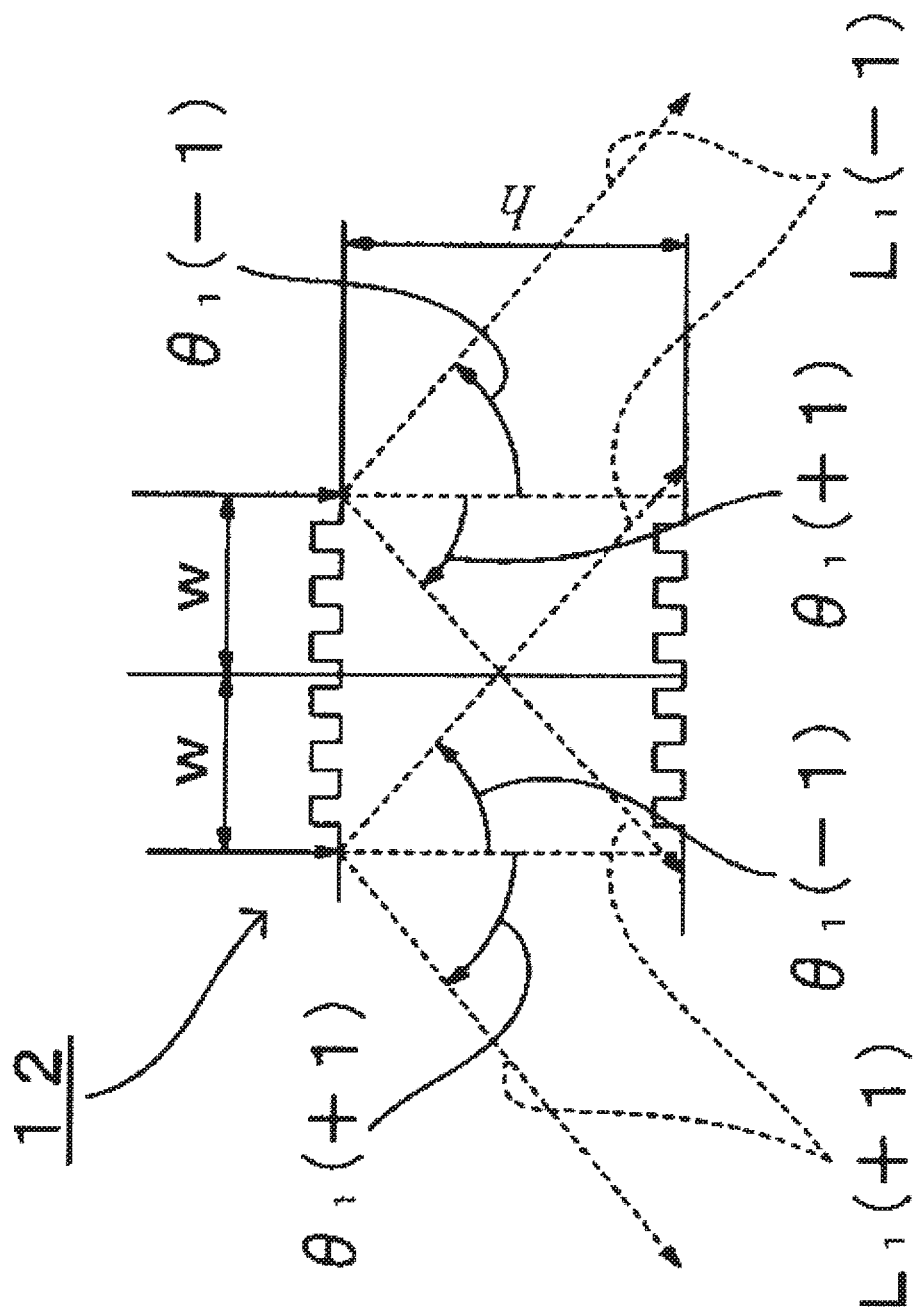
FIG. 11 is an explanatory diagram for illustrating a method for designing optimum relationship between a thickness of the light guide substrate and areas of the first sub-wavelength grating and the second sub-wavelength grating in Embodiment of the light guide substrate according to the present invention.

Still further, in present embodiment, the design of collimation lens 8 is optimized. That is, the optimum lens surface shape is designed upon determining the NA and focal length f of the LD. More specifically, as described above, the NA of the LD is set as 0.6, and further, focal length f is set as about 2 mm. Accordingly, the lens surface shape of collimation lens 8 capable of making the light emitted by the LD into a parallel light having a beam diameter of about 1 mm is designed. The lens surface shape can be designed according to a known method for designing a lens surface. The intensity distribution of the light collimated by collimation lens 8 thus designed is known to have Gaussian distribution in terms of space. In practice, there would not be any problem as long as the width and the depth of first sub-wavelength grating 12 in FIG. 11 are about twice the width and the depth of a mode field diameter of the light incident from collimation lens 8 (Gaussian beam).

In present embodiment, the optimum relationship between the thickness of the resin substrate corresponding to the thickness of light guide substrate 5 and the size of area of first sub-wavelength grating 12 and second sub-wavelength grating 15 is considered. In other words, as shown in FIG. 11, it is assumed that light L emitted by the LD and collimated by collimation lens 8 is incident upon first sub-wavelength grating 12, and the ±1st order lights $L_1(+1)$, $L_1(-1)$ advance with predetermined diffraction angles $\theta_1(+1)$, $\theta_1(-1)$ ($\theta_1(+1)=\theta_1(-1)$) within the resin substrate. Then, in present embodiment, assume that the mode field diameter of the beam of light L incident upon first sub-wavelength grating 12 is w, the width and the depth of first sub-wavelength grating 12 in FIG. 11 and the width and the depth of second sub-wavelength grating 15 in FIG. 11 are both 2w, and the thickness of the resin substrate is h. Accordingly, the condition where the ±1st order lights $L_1(+1)$, $L_1(-1)$ are not incident upon second sub-wavelength grating 15 is obtained. This condition is expressed by the following equation.

$$h \cdot \tan \theta \leq 2w \qquad \text{(Equation 9)}$$

However, θ in equation 9 is either $\theta_1(+1)$ or $\theta_1(-1)$. In this case, it is understood that, when the value of w in equation 9 is set as 1.0 mm corresponding to the beam diameter of light L emitted from collimation lens 8, and the value of θ in equation 9 is set as 46.24 degrees like first sub-wavelength grating 12 as shown in FIG. 7, then h is required to satisfy h≥11.92 mm. When this condition is satisfied, the ±1st order lights $L_1(+1)$, $L_1(-1)$ are not incident upon second sub-wavelength grating 15, and all of the lights are totally reflected by the back surface of the resin substrate, and the lights propagate within the resin substrate.

On the other hand, the 0th order light $\theta_1(0)$ generated by first sub-wavelength grating 12 is incident upon second sub-wavelength grating 15 as is. In this case, the majority of the 0th order light $\theta_1(0)$ incident upon second sub-wavelength grating 15 is reflected with predetermined diffraction angle $\theta_2(+1)$, $\theta_2(-1)$ (note that $\theta_2(+1)=\theta_2(-1)$) as the ±1st order lights $L_2(+1)$, $L_2(-1)$ by second sub-wavelength grating 15. In present embodiment, in addition to equation 9, the condition is obtained where the ±1st order lights $L_2(+1)$, $L_2(-1)$ generated by second sub-wavelength grating 15 are not incident upon first sub-wavelength grating 12. This condition is expressed by the following equation when h and w defined in equation 9 are used.

$$h \cdot \tan \theta' \geq 2w \qquad \text{(Equation 10)}$$

However, θ' in equation 10 is either $\theta_2(+1)$ or $\theta_2(-1)$. In this case, it is understood that, when the value of w in equation 10 is set as 1.0 mm like the value substituted into equation 9, and the value of θ' in equation 10 is set as 58.34 degrees like second sub-wavelength grating 15 as shown in FIG. 10, then h is required to satisfy h≥1.23 mm. When this condition is satisfied, the ±1st order lights $L_2(+1)$, $L_2(-1)$ are not incident upon first sub-wavelength grating 12, and all of the lights are totally reflected by the front surface of the resin substrate, and the lights propagate within the resin substrate.

It should be noted that the minimum value of h satisfying the condition of equation 10 (1.23 mm) is less than the minimum value of h satisfying equation 9 (1.92 mm), and therefore, it is understood that, when the condition of equation 9 is satisfied, the condition of equation 10 is immediately satisfied.

Therefore, when equation 1 explained above including equation 9 and equation 10 is satisfied, the ±1st order lights $L_1(+1)$, $L_1(-1)$ generated by first sub-wavelength grating 12 can be prevented from being incident upon second sub-wavelength grating 15, and the ±1st order lights $L_2(+1)$, $L_2(-1)$ generated by second sub-wavelength grating 15 can be prevented from being incident upon first sub-wavelength grating 12.

It should be noted that the 0th order light generated by second sub-wavelength grating 15 returns back to first sub-wavelength grating 12, but the ratio of this component is extremely low, i.e., 6.38%×0.86%=0.055%. In this case, the light returned to first sub-wavelength grating 12 is diffracted by first grating 12 again. In this case, the light is incident from the inside of the substrate upon the grating 12, and therefore, when the diffraction efficiency is calculated at this occasion, the diffraction efficiency may be slightly different from the case where the light is incident from the outside of the substrate upon grating 12. However, when it is actually calculated according to the RCWA method explained above, the 0th order diffraction efficiency and the ±1st order diffraction efficiency are the same, i.e., 6.38% and 86.61%, respectively. The 0th order light passes through grating 12 and returns back to the light source. However, the component returning back to the light source is 6.38%×0.86%×6.38%=0.0035%, and this means that the light hardly returns back to the light source.

Light guide substrate 5 and optical system 6 designed and manufactured according to such designing method can be applied to various kinds of uses, and can be used for, for example, a light guide plate for uniformly illuminating a display surface, a separation optical system for separating light into uniform portions of area, or a uniform spatial lighting system.

As described above, according to the present invention, while light L emitted by light emitting device 7 is totally reflected by upper surface 10 and lower surface 11 of substrate main body 5a as the ±1st order lights $L_1(+1)$, $L_1(-1)$ generated by first sub-wavelength grating 12 and the ±1st order lights $L_2(+1)$, $L_2(-1)$ generated by second sub-wavelength grating 15, the light can propagate in the direction perpendicular to the thickness direction. Therefore, the light emitted by light emitting device 7 can propagate with as high efficiency as possible in such a manner that the light is confined.

It should be noted that the present invention is not limited to the above configuration, and can be changed as necessary in various manners.

For example, the planar shapes of first sub-wavelength grating 12 and second sub-wavelength grating 15 are not limited to rectangular shapes as shown in FIGS. 3 and 4. For example, the planar shapes thereof may be circular shapes.

The disclosure of Japanese Patent Application No. 2009-144411, filed on Jun. 17, 2009, including the specification, drawings and abstract, is incorporated herein by reference in its entirety.

INDUSTRIAL APPLICABILITY

The light guide substrate and optical system having light guide substrate according to the present invention are suitable for transmitting light emitted by a light emitted by an apparatus such as laser.

REFERENCE SIGNS LIST

5 Light guide substrate
5a Substrate main body
6 Optical system
7 Light emitting device
8 Collimation lens
10 Upper surface
11 Lower surface
12 First sub-wavelength grating
15 Second sub-wavelength grating
17 Lattice shape
18 Metallic thin film

The invention claimed is:

1. A light guide substrate comprising a substrate main body formed to have a predetermined thickness, wherein a transmitting-type first sub-wavelength grating is formed on a surface of one side of the substrate main body in a thickness direction, wherein light emitted by a light emitting device is incident upon the first sub-wavelength grating in a direction substantially perpendicular to the surface of the one side of the substrate main body, and the first sub-wavelength grating passes the light and generates a 0th order light and ±1st order lights, a reflection-type second sub-wavelength grating is formed on a surface of the other side of the substrate main body in the thickness direction, wherein the second sub-wavelength grating reflects and diffracts the 0th order light having passed through the first sub-wavelength grating, thereby generating the ±1st order lights advancing with a predetermined diffraction angle, and the second sub-wavelength grating is formed to face the first sub-wavelength grating in the thickness direction, and the ±1st order lights generated by the first sub-wavelength grating and the ±1st order lights generated by the second sub-wavelength grating are totally reflected by the surface of the one side of the substrate main body in the thickness direction and the surface of the other side of the substrate main body in the thickness direction, and wherein conditional equation 1 below is satisfied, $$h \cdot \tan[\min(\theta, \theta')] \geq 2w \qquad \text{(Equation 1)},$$

where h denotes a thickness of the light guide substrate,
θ denotes a diffraction angle of the ±1st order light generated by the first sub-wavelength grating,
θ' denotes a diffraction angle of the ±1st order light generated by the second sub-wavelength grating,
min(θ, θ') denotes a smaller value of θ and θ', and
w denotes a beam diameter of the light emitted by the light emitting device and incident upon the first sub-wavelength grating.

2. The light guide substrate according to claim 1, wherein the second sub-wavelength grating includes a structure of a lattice shape formed on the substrate main body and a metallic thin film formed on the surface of the structure of the lattice shape.

3. An optical system comprising the light guide substrate according to claim 1, wherein the light emitting device according to claim 1 is arranged at a position facing the first sub-wavelength grating of the light guide substrate, and a collimation lens is provided between the light emitting device and the first sub-wavelength grating so as to collimate the light emitted by the light emitting device and causes the collimated light to be incident upon the first sub-wavelength grating.

4. The optical system according to claim 3, wherein the light emitting device is any one of an LED, a semiconductor laser, a gas laser, and a solid laser.

5. The light guide substrate according to claim 1, wherein the ±1st order lights generated by the first sub-wavelength grating and the ±1st order lights generated by the second sub-wavelength grating are totally reflected by the surface of the one side of the substrate main body in the thickness direction and the surface of the other side of the substrate main body in the thickness direction and are propagated between the surface of the one side of the substrate main body in the thickness direction and the surface of the other side of the substrate main body in the thickness direction, through the substrate main body.

* * * * *